(No Model.) 6 Sheets—Sheet 1.

O. F. JÖNSSON.
DYNAMO ELECTRIC MACHINE.

Figure 1:
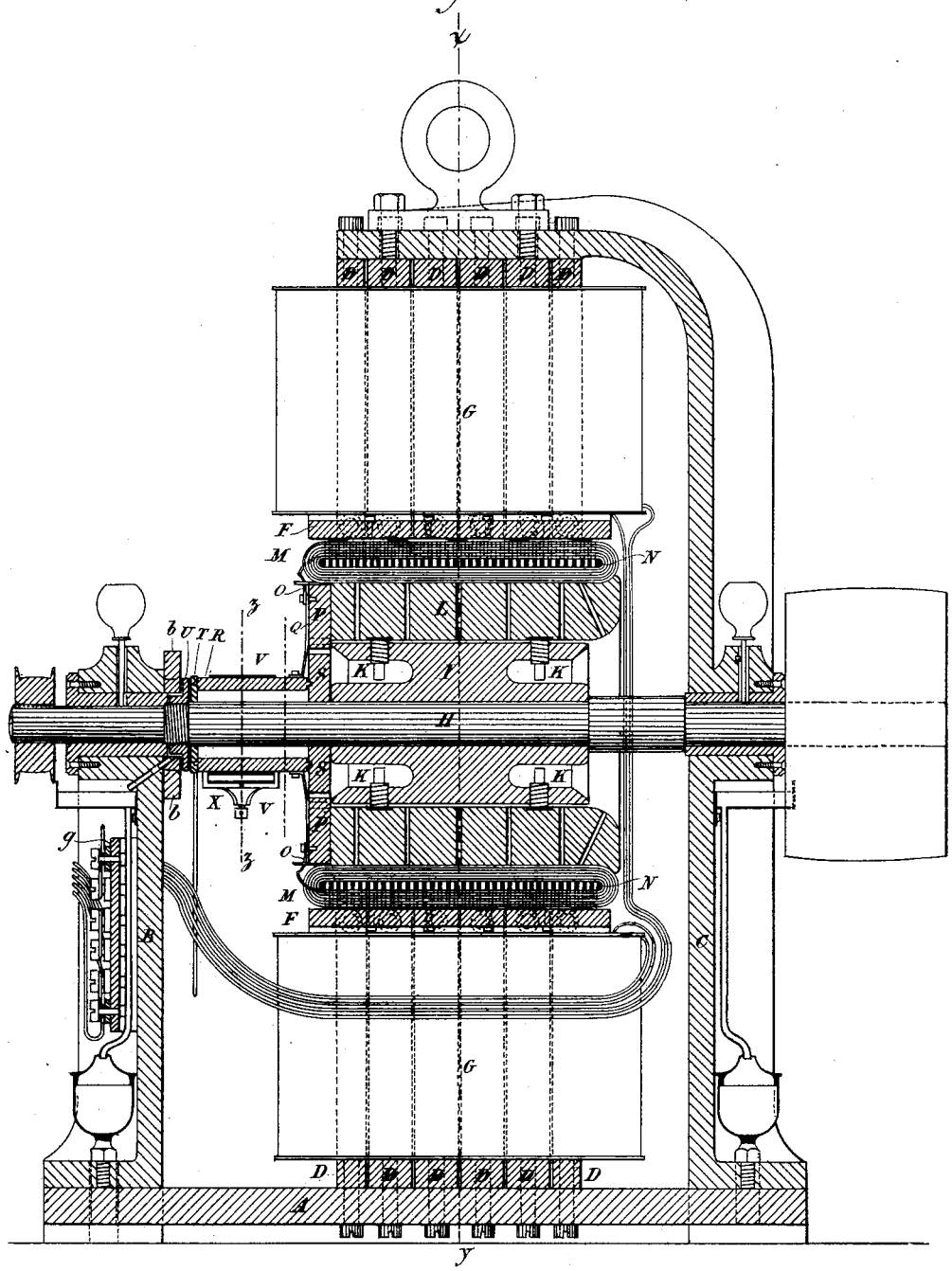

No. 330,836. *Fig. 1.* Patented Nov. 17, 1885.

Witnesses.
O. C. Davidson
James Young.

Inventor:
Oscar Fredrik Jonsson,
by his Attorneys
Baldwin, Hopkins & Peyton (No Model.) 6 Sheets—Sheet 2.

O. F. JÖNSSON.
DYNAMO ELECTRIC MACHINE.

No. 330,836. Patented Nov. 17, 1885.

(No Model.) 6 Sheets—Sheet 3.

O. F. JÖNSSON.
DYNAMO ELECTRIC MACHINE.

No. 330,836. Patented Nov. 17, 1885.

(No Model.) 6 Sheets—Sheet 4.

O. F. JÖNSSON.
DYNAMO ELECTRIC MACHINE.

No. 330,836. Patented Nov. 17, 1885.

Witnesses
E. E. Davidson
James Young.

Inventor:
Oscar Fredrik Jonsson,
by his Attorneys
Baldwin, Hopkins & Peyton.

(No Model.) 6 Sheets—Sheet 5.
O. F. JÖNSSON.
DYNAMO ELECTRIC MACHINE.
No. 330,836. Patented Nov. 17, 1885.
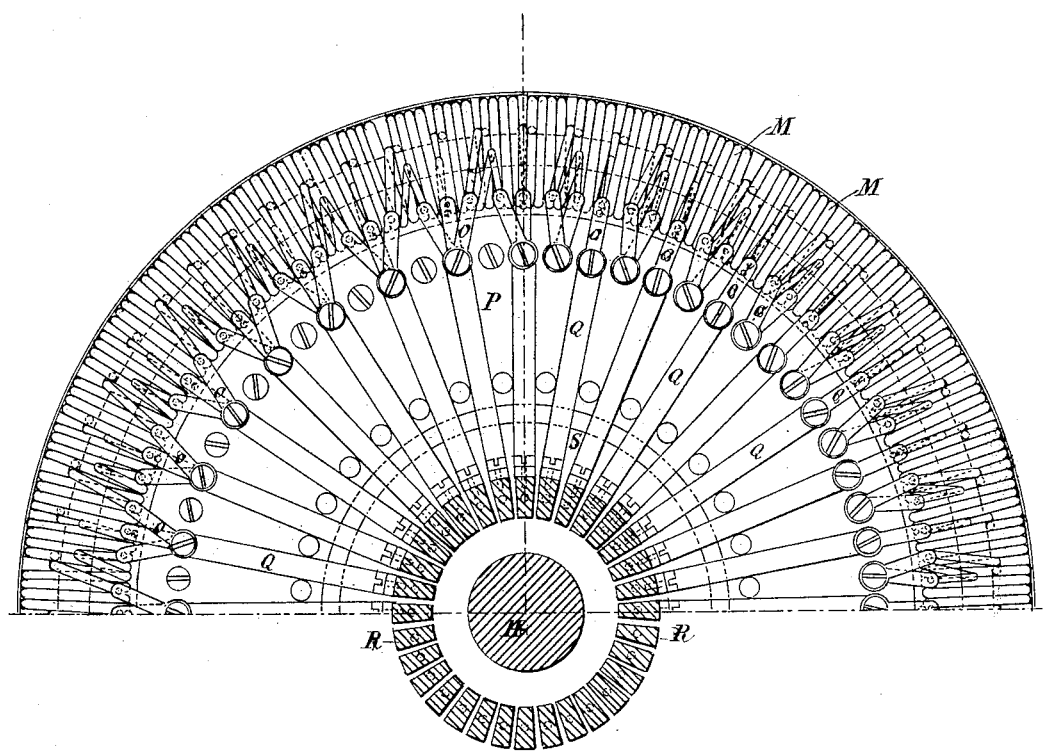
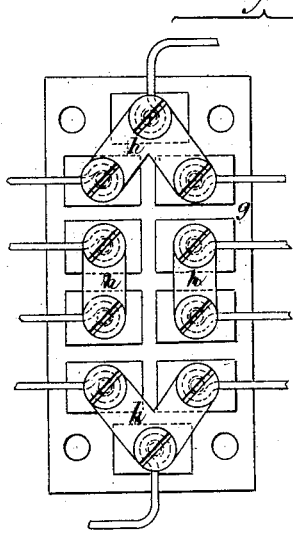
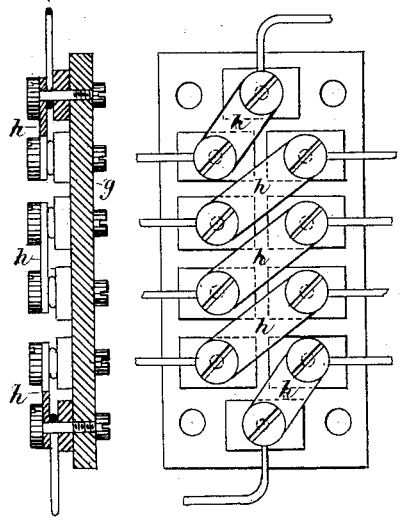
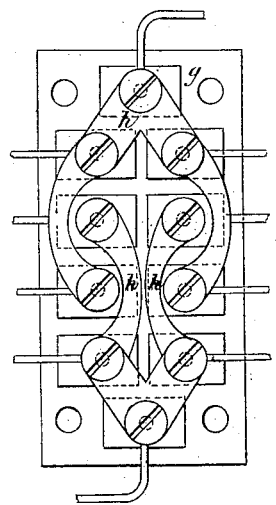

(No Model.)  
6 Sheets—Sheet 6.
O. F. JÖNSSON.
DYNAMO ELECTRIC MACHINE.
No. 330,836. Patented Nov. 17, 1885.
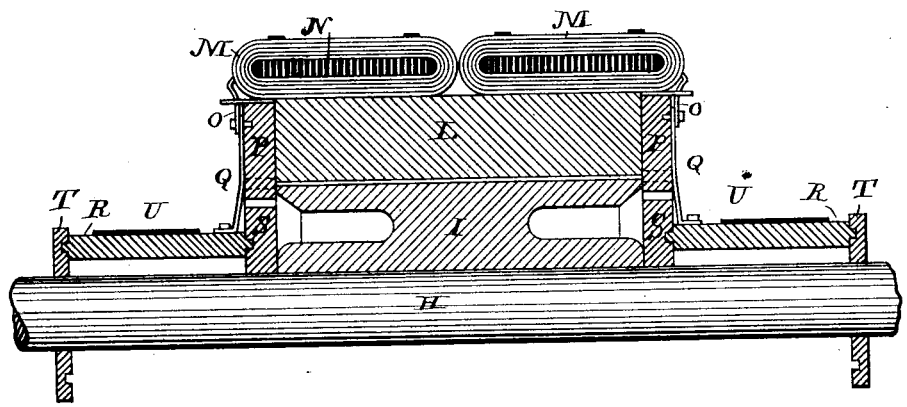
Fig. 9ᵃ.
WITNESSES
Ed. A. Newman.
Al. C. Newman.
INVENTOR
Oscar Fredrik Jönsson,
By his Attorneys
Baldwin, Hopkins & Peyton.

UNITED STATES PATENT OFFICE.

OSCAR FREDRIK JÖNSSON, OF STOCKHOLM, SWEDEN.

DYNAMO-ELECTRIC MACHINE.

SPECIFICATION forming part of Letters Patent No. 330,336, dated November 17, 1885.

Application filed February 10, 1885. Serial No. 155,514. (No model.)

*To all whom it may concern:*

Be it known that I, OSCAR FREDRIK JÖNSSON, a subject of the King of Sweden, residing at Stockholm, Sweden, have invented certain new and useful Improvements in Dynamo-Electric Machines, of which the following is a specification.

A good dynamo-electric machine ought to have the following properties:

First. It ought to transform into electricity as much as possible of the mechanical work consumed on the machine-shaft; further, it ought to be disposed so that the production of extra currents, sparks, and friction in the bearings and contact-brushes is obviated as much as possible. Besides the improved effect, the further advantage is attained that the iron masses of the machine, working as magnets, are not heated by so-called "Foucault currents."

Secondly. The machine ought to deliver the greatest quantity possible of electricity with the least possible mass of wire and magnetic iron. Thereby, besides that the machine will be easy to be handled, and that its net cost will be reduced, the further advantage is obtained that the mechanical work requisite for rotating the inductor will be diminished in consequence of the less weight of the latter.

Thirdly. The interior resistance of the machine should be capable of variation over a wide range, whereby it is possible to employ the same machine for almost all the purposes for which dynamo-electric machines are usually employed—for instance, for arc-lights in series, single arc-light with variable power of light, lighting by means of incandescent lamps of different powers, transfer of power to variable distances and with different conductors for the same distance, electro-deposition of metals, and the like. This is attained by coupling dispositions hereinafter described, whereby I not only can vary the interior resistance of the machine, but also its electromotive power, without needing, however, to vary the speed of rotation; hence one such variable dynamo-machine may replace several machines not thus variable. All these properties are united in the continuous-current dynamo-machine represented in the annexed drawings.

Figures 2, 10:
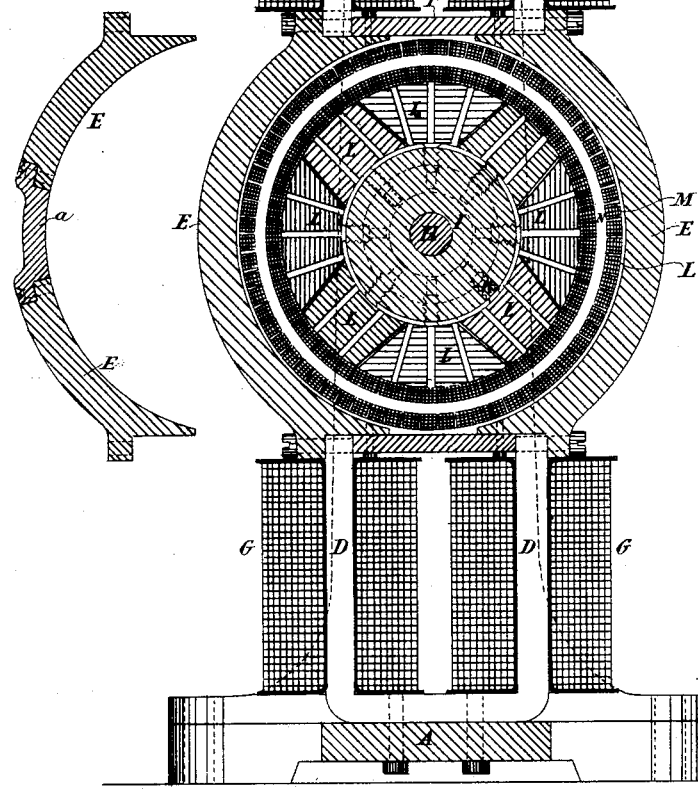
Figure 3:
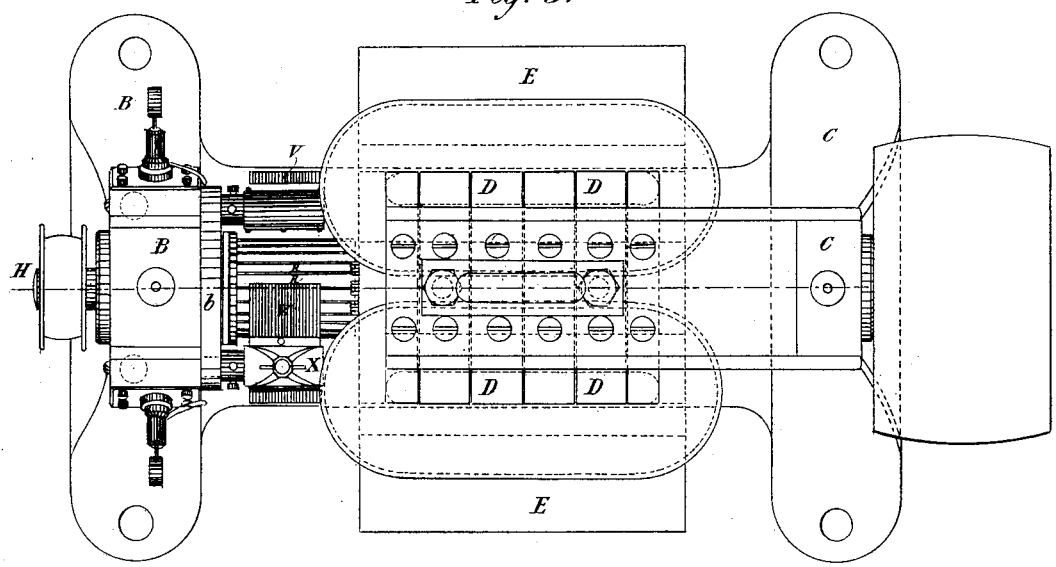
Figure 9:
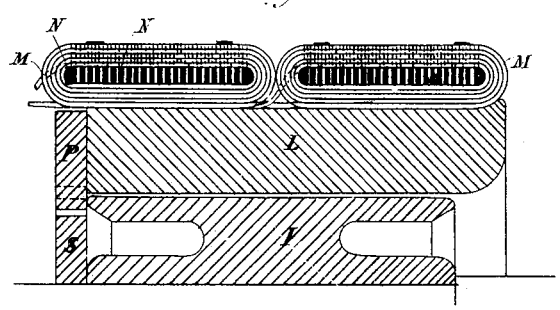
Figure 4:
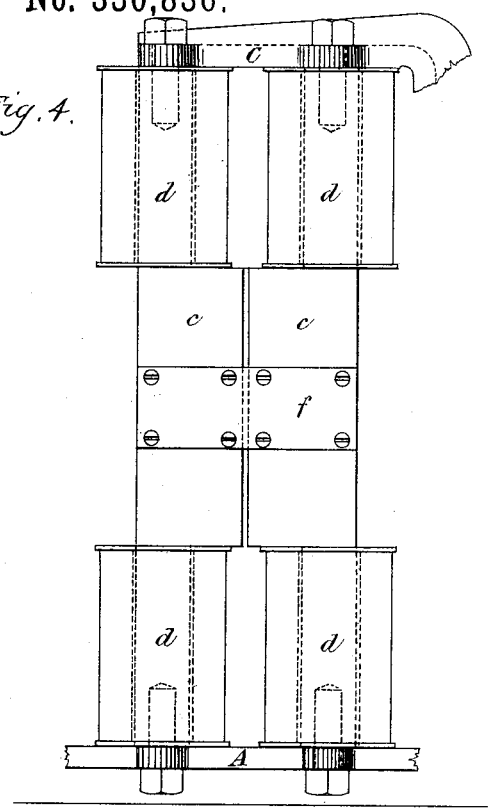
Figure 5:
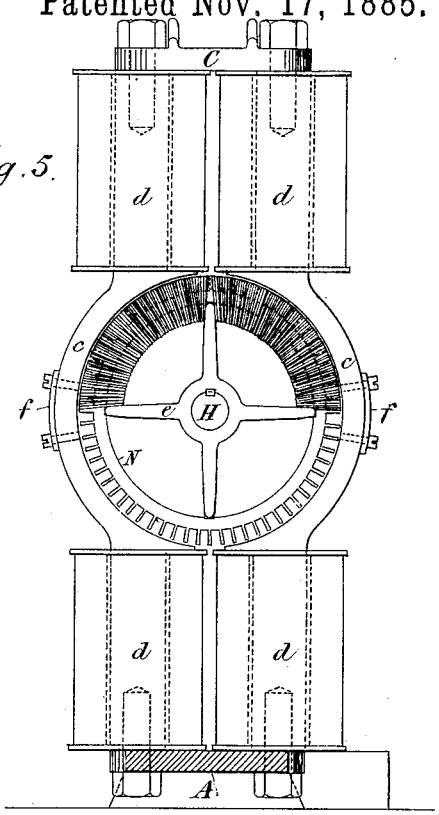
Figure 6:
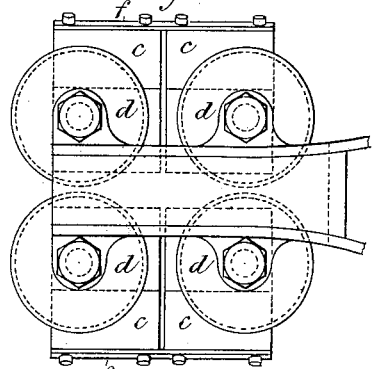
Figure 7:
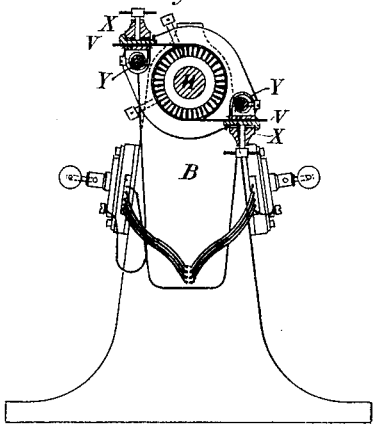
Figure 11:
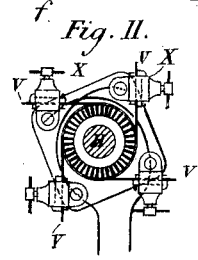

In the drawings, Figure 1 is a vertical section of a dynamo-machine constructed in accordance with the invention. Fig. 2 is a cross-section on the line $x\,y$ in Fig. 1, and Fig. 3 is a plan of the machine. Figs. 4, 5, and 6 represent a modified disposition of the machine, viewed from the side, from the end, and in plan, respectively. Fig. 7 shows the foremost bracket, viewed from the interior, with the arrangements for collecting the current, the collector being in section on the line $z\,z$, Fig. 1. Fig. 8 shows the manner in which the coils in the rotating armature or inductor are connected. Figs. 9 and 9$^a$ show an alternative construction of the inductor. Fig. 10 shows an alternative construction of the field-magnets. Fig. 11 shows a modification of the commutator. Figs. 12, 13, and 14 illustrate methods of coupling the coils of the field-magnets.

The machine (see Fig. 1) consists of two brackets, B and C, fixed on a base, A, of which the latter is at the top bent to an angle in order to retain the electro-magnets. The latter are composed of a number of curved iron bars, D, preferably of wrought-iron, attached some to the bottom plate and some beneath the bracket C. These bars are connected by means of two bent pieces, E, of iron, forming the pole-pieces and receiving contrary polarity. F are non-magnetic metallic plates interposed between the ends of the bars D and screwed to the pieces E, in order to keep them stayed. The electro-magnet coils G are, as will be seen, applied round the legs of the bars D, whereby four such coils are obtained.

The inductor consists of a metal center, I, attached to the shaft H, and into the flanges of which are introduced a number of adjusting-screws, K. Round this center several pieces, L, of wood or other suitable material, perforated in the direction of the radius, are placed, and they are pressed outward by means of the adjusting-screws. Round the pieces L the inductor-coils M are placed. These are wound round a great number of iron rings, N, placed one near the other, with intermediate pieces of asphalted pasteboard, or such like, whereby the iron rings are insulated one from another, and openings are left between them. The rings are made (see Fig. 2) with numerous projecting points, between which the wire is wound in the manner shown by Figs. 1 and 2, so that the exterior part of each bobbin is placed between two rows of points.

In order to prevent the centrifugal force from displacing the wire from its position in the groove, the inductor is surrounded with ties. The extremities of the wires from each bobbin are connected with their respective coupling-pieces O, which, by means of screws, are attached to a plate, P, of insulating material situated at the one end of the inductor. In this plate there is room for as many screws as there are bobbins in the inductor, and with each screw the exterior extremity of the one bobbin and the interior extremity of the other bobbin may be connected.

Fig. 8 represents half of the inductor, viewed from the end where the connecting-plate P is placed. The left and the right half of the figure represent two different modes of connecting the inductor-bobbins. The right half of the figure represents the above disposition where two adjoining bobbins are connected one after the other, whereby all the bobbins are connected into one continuous circuit—that is, for tension. The left side of the same figure represents two adjoining bobbins connected one abreast of the other—that is, for quantity. In the former case the interior end of one bobbin is connected with the exterior end of the adjoining bobbin, while every alternate connection is coupled with one of the radial pieces Q. In the latter case all the coupling-pieces not connected with a radial piece are separated, and of these all the coupling-pieces of the interior wire ends are placed to the radial piece to the left of it, and on the coupling-pieces of the exterior wire ends to the radial piece on the right, where they are fixed beneath the screw-heads of these radial pieces. Thus every second screw becomes free. When the machine is thus arranged, the current will meet with only the fourth part of the resistance existing in the first-described case, when the current passes through all the bobbins one after another.

In order to increase still more the possibility of connecting the bobbins in parallel arc, the number of radial pieces may be diminished by connecting only every fourth, sixth, eighth, &c., screw with the collector by means of the radial piece, and the collector must in each case be modified in conformity.

Fig. 9 represents a modified mode of disposing the inductor-coil by placing two or more inductor-rings one abreast of another and connecting these bobbins either for tension or for quantity.

Another modification (shown in Fig. 9ª) is that two coupling-disks may be used—one at each end of the inductor—in which event the inductor-rings, placed one abreast of another, are connected each with its coupling-disk. In this case, however, two collectors and brush apparatuses must be employed. Hereby the advantage is attained that the connections may be modified in a greater number of modes. Thus, for instance, one ring may serve all the coils of the stationary magnets, or only half of these coils, in which latter event the second ring serves the remaining half. In the latter case the different circuits may have different resistance and supply each its circuit with currents.

The collector consists of as many metal bars R as there are radial pieces Q, which bars are arranged without any intermediate insulating-matter to a cylinder having interspaces between the bars. These bars are in their extremities provided with tenons entering into holes in two disks, S and T, of ebonite or other insulating matter carried upon the shaft H. The whole is kept together by means of a nut, U, pressing the collector against the metal center I, which abuts against a shoulder on the shaft. With this collector there is no place where small metal particles can collect and form conducting-bridges from one piece across to another, and thus cause sparks or short-circuiting. The brush V is fixed by means of screws to a metallic holder, X, pivoting round a spindle, within which holder is a spring, Y, tending to press the brush against the collector. When two whole pole-pieces E are used, two brushes are employed, as shown in Figs. 1, 3, and 7; but if, on the contrary, such pole-pieces as represented in Fig. 10 are used, in which are placed pieces of non-magnetic metal a, whereby the machine obtains four poles, four brushes will be necessary. (See Fig. 11.) The spindles of the brushes are fixed in a plate, b, which may be turned round a stationary center at will, so that the contact-points of the brushes with the collector may be displaced and adjusted to suit the speed at which the inductor is wanted to revolve.

A modification of the field-magnet is represented by Figs. 4, 5, and 6, where the stationary magnets consist of four entire pieces, c, the central parts of which are bent in circular form. The extremities of the pieces c are round and surrounded by the electro-magnet bobbins d, which in this case will be eight in number. These stationary magnets are fixed by means of screws at their top and bottom to the base A and the bracket C. Fig. 5 represents, also, a modification of the mode of fixing the inductor-ring upon the shaft. Here the metal center and the wood pieces are replaced by a metal cross, e. f are metallic plates, fixed by means of screws outside the magnet-pieces c, in order to retain them in position. In order to be able, also, to vary the resistance for the current in its passage through the coils of the electro-magnets, the ends of these coils are joined by means of screws on a coupling-plate, g, of ebonite or other insulating material. By connecting the different screws by pivoted metal strips h of suitable forms in the manner shown by Figs. 12, 13, and 14 all the coils may be coupled in series, or two and two abreast, or four abreast, whereby the resistances are varied.

By employing eight magnet-coils it will be possible to vary these couplings to a greater extent.

Having now particularly described and ascertained the nature of my said invention and in what manner the same is to be performed, I declare that what I claim is—

1. The combination, in an inductor for dynamo-electric machines, of the metallic center, the adjusting-screws, the perforated wooden blocks, the toothed metallic rings arranged around the blocks, the insulating material between the rings, and the wires wound around the rings, substantially as set forth.

2. The combination, substantially as set forth, of the inductor-bobbins, the collector, the coupling-plate arranged at one side of the inductor between the collector and the bobbins, and the radial bars leading from the collector to the bobbins.

3. The combination, substantially as set forth, of the inductor-bobbins, the collector, the coupling-plate, the links by which the bobbins may be connected, and devices for connecting the links with the collector.

4. The combination, substantially as set forth, of two or more flat inductor-rings arranged side by side, their supports, the coupling plate or plates, and devices on the plates whereby the wires of the inductor-rings may be connected.

OSCAR FREDRIK JÖNSSON.

Witnesses:
  NERE A. ELFWING,
  ERNST SVANGVIST.